Patented May 28, 1935

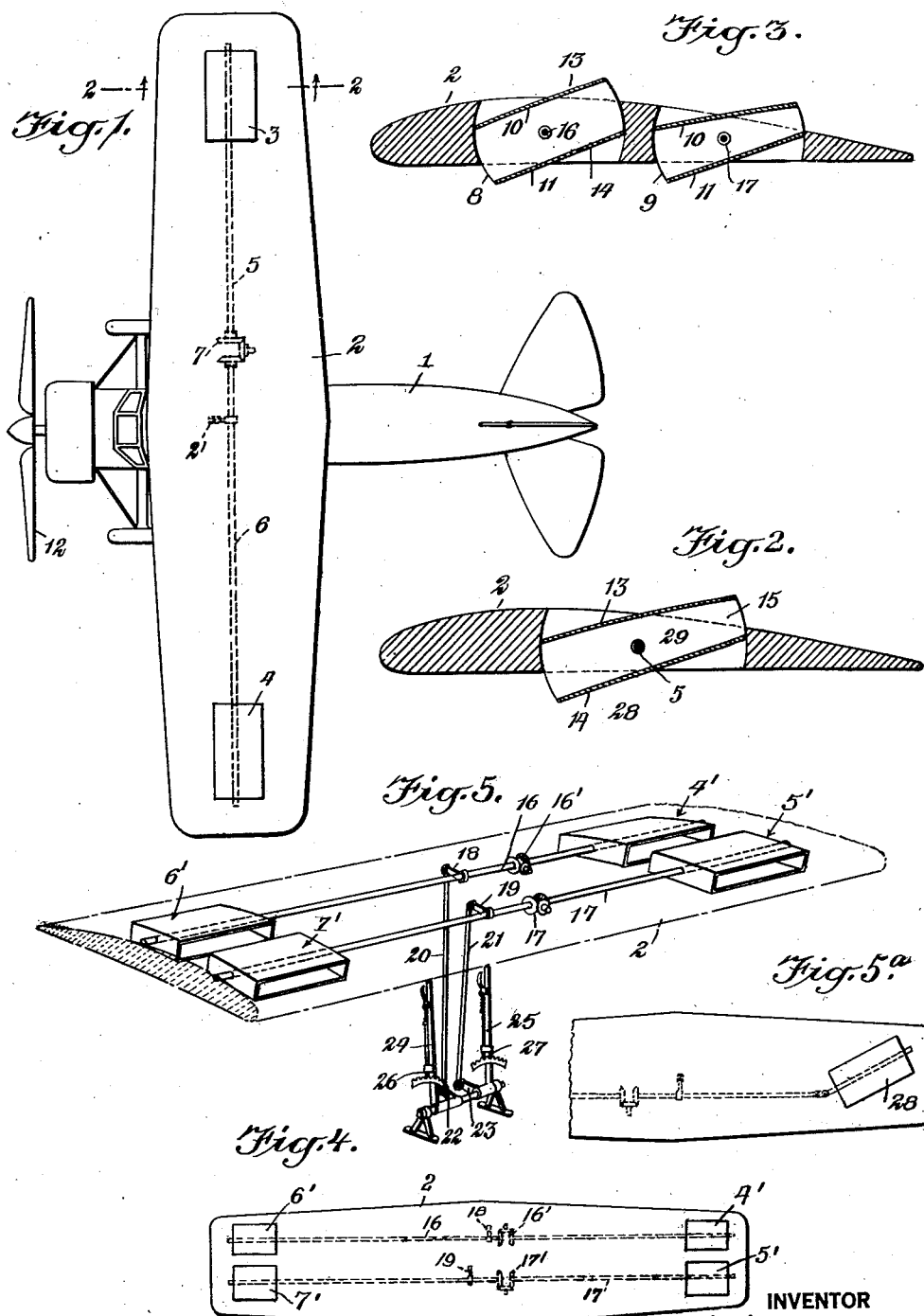

2,003,223

UNITED STATES PATENT OFFICE 2,003,223

AIRPLANE

William K. Rose, New York, N. Y.

Application June 17, 1933, Serial No. 676,386

4 Claims. (Cl. 244—29)

This invention relates to airplanes and has for an object to provide an improved construction wherein shutters or deflecting vanes are provided in the wing surface to secure either a lifting or retarding action for a complete plane or for either end of the wing surface as preferred.

Another object of the invention is to provide an improved airplane wherein shutter arrangements are provided in the wing surface formed to direct air either from the bottom to the top or from the top to the bottom centrally between the leading and trailing edges, or at other points according to the desire of the aviator.

An additional object, more specifically, is to provide a substantially boxed shutter structure connected to suitable controls and positioned to act either as ailerons or as lifting or retarding members, the parts being positioned either near the fuselage or near the outer ends of the wing surface as may be desired, with the shutter members so formed that they may be parallel with the upper and lower surfaces respectively of the wing surfaces, or tilted to cause the air to pass from the top of the wing surface to the bottom or in a reverse direction.

In the accompanying drawings—

Figure 1 is a plan view of an airplane with an embodiment of the invention applied thereto;

Figure 2 is a sectional view through Figure 1 on the line 2—2, the same being on an enlarged scale;

Figure 3 is a view similar to Figure 2, but showing a slightly modified construction wherein two shutter structures are provided;

Figure 4 is a top plan view of a wing structure similar to that shown in Figure 1, but with a double shutter structure arrangement;

Figure 5 in a diagram in perspective, illustrating how the shutters are controlled and manipulated;

Figure 5a is a fragmentary top plan view of an airplane wing with a further modified form of aileron structure illustrated.

Referring to the accompanying drawings by numerals, 1 indicates a fuselage of a well known type, and 2 a wing structure connected to the fuselage. As illustrated in Figure 1, the usual ailerons are omitted and in place thereof there are provided auxiliary wings or shutter structures 3 and 4. These structures are in the form of boxes open at the front and rear, as illustrated particularly in Figures 2 and 3. Also it will be understood that these shutter structures are arranged with their pivotal axes extending longitudinally of the wing structure. Shafts 5 and 6 are connected to the respective shutter structures and to a control lever 2' whereby as this control lever is moved back and forth these auxiliary wings or shutter structures will be caused to function. As the structure is mounted to act as an aileron rather than as a lifting or depressing member, a reversing mechanism 7 is used so that when the lever 2' is pulled in one direction one of the shutter structures will be tilted as shown in Figure 2 and the other will be tilted in the opposite direction, thus producing a lifting action on one end of the wing structure and a drag on the other end so that the airship may be properly banked or otherwise actuated. Preferably the shutter members 3 and 4 are arranged near a central line on the wing structure and midway between the leading and trailing edges, though if desired they could be arranged at some other point without departing from the spirit of the invention. Instead of having the ailerons at the extreme outer ends of the shutter structures they could be moved inwardly an appreciable distance and yet caused to function properly.

When the parts are moved to the position shown in Figures 1 and 5, for instance, the shutter structures are not functioning and the upper and lower surfaces of the wing structure are unbroken so that the wing structure will act in the usual manner. However, when the shutter structures are tilted so that one will be as shown in Figure 2, air will pass from the under surface to the upper surface on the structure tilted downwardly, while the opposite structure will function in the opposite direction. It will be understood that the shutter structures may be tilted to any desired extent so that only a small amount of air will be allowed to pass according to the will of the aviator. Preferably the trailing edge of the respective shutter structures are further from the respective shutter shafts 5 and 6 than the leading edge so that there will always be a tendency for the shutter structures to line up and become inoperative whenever permitted to do so. If desired, however, the shutter structures can be evenly balanced so as to move to a neutral position when standing still on the ground and also moved to a neutral position by reason of the extra length at the rear when the airship is in flight, the last movement being caused by wind pressure.

As illustrated in the drawings the shutter structure is provided with upper and lower shutter members 13 and 14 connected by the end members 15 so as to make a box structure, as illustrated more particularly in diagram in Figure 3. Shaft 5, as illustrated in Figure 2, is connected to the end members 15 so as to cause the shutter structure to function. The same is true of the opposite end of the wing structure.

As illustrated in Figures 3, 4 and 5, the invention is applied in duplicate as ailerons with independent control means which are shown more particularly in Figure 5. As illustrated in this figure the shutter structures 4', 5', 6' and 7' are connected to the respective shafts 16 and 17. These shafts are provided with suitable reversing mechanisms 16' and 17' similar to the reversing mechanism 7, so that the shutter structures at the respective ends of the wing structure may function properly to act as ailerons. The shutter structures as illustrated in Figure 3, when depressed, permit air to enter in at the open ends 8 and 9 and pass out the opposite ends above the wing structure. When moving in this direction the air passing through the ailerons strikes the surface 11. The upper surfaces 10 and 13 are intended to be flush with the upper and lower surfaces of the wing structure when the shutter structures are nonfunctioning, as illustrated particularly in Figure 5.

When it is desired to cause either pair of shutter structures to operate, the mechanism shown in Figure 5 which is one method of control, is actuated. The lever 25 pivotally mounted on a suitable support is normally held in different positions by the catch 27. When this lever is actuated in one direction it will cause arm 23 to move and link 21 to be moved accordingly, which in turn will transmit power through lever 19 to shaft 17, whereby the shaft is rocked to the desired extent. The same is true of the other mechanism. For instance, if lever 24 is moved after disengaging catch 26, such movement will cause arm 22 to function and move link 20, thus transmitting power to and through the arm or lever 18 to shaft 16. This will produce a rocking action on shaft 16 for tilting the structures connected therewith. It will thus be seen that all of the aileron structures may be tilted in the same way at the same time, or they may be tilted independently and to any desired extent.

In Figure 5a a further modified form of the invention is shown wherein the wing structure 28 is the same as either of the wing structures 3 and 4 but is positioned diagonally or at an angle to the longitudinal axis of the wing surface. By arranging the shutter structure in this way there may be a more gradual opening and closing thereof so as to secure a more delicate control.

I claim:—

1. An airplane including a wing structure formed with a plurality of openings therein between the respective ends thereof and the fuselage, and also between the leading and trailing edges, a box shutter structure arranged in each of said openings, each shutter structure being provided with top and bottom vanes open at the front and rear, a shaft rigidly secured centrally to each of the shutter structures and means for rocking said shafts so as to cause the leading edges of the shutter structures to project either above or below the wing structure according to the direction the air is to be deflected.

2. An airplane including a wing structure having a plurality of openings on opposite sides of the fuselage between the leading and trailing edges of the wing structure, a shutter structure pivotally arranged in each of said openings for movement of the leading edge above and below the wing structure, each of said shutter structures including a top and bottom vane adapted to be positioned with their outer surfaces substantially flush with the upper and lower surfaces of the wing structure when in nonfunctioning position, and manually controlled means for tilting each of the shutter structures so as to deflect air from the upper surface to the lower surface or in a reverse direction, and also when differently positioned to direct air through the shutter structure at one end of the wing structure upwardly while directing air through the shutter structure at the opposite end of the wing structure downwardly.

3. An airplane including a wing structure having a plurality of openings therein on opposite sides of the fuselage, a substantially rectangular shutter structure arranged in each of the openings, each of said shutter structures having a top and bottom vane with a free passageway between the vanes, rotatable means for supporting each of the shutter structures and manually controlled means for shifting the shutter structures so as to be flush with the wing structure or positioned with the leading edge above or below the wing structure.

4. An airplane including a wing structure having an opening therein near the respective outer ends thereof, a shutter structure having top and bottom vanes arranged in each of said openings acting as ailerons, said shutter structures being pivotally mounted for movement of the leading edge above and below the wing surface in said openings, and manually actuated means for controlling the shutter structures independently whereby they may be positioned flush with the top and bottom of the wing or moved to cause a drag or lift as desired.

WILLIAM K. ROSE.